United States Patent [19]

Hashimoto

[11] Patent Number: 5,691,862
[45] Date of Patent: Nov. 25, 1997

[54] RECORDING/REPRODUCING APPARATUS WITH AN INTEGRATED INDUCTIVE WRITE, MAGNETORESISTIVE READ HEAD

[75] Inventor: Masanobu Hashimoto, Tokyo, Japan

[73] Assignee: NEC Corporation, Tokyo, Japan

[21] Appl. No.: 687,961

[22] Filed: Jul. 29, 1996

Related U.S. Application Data

[62] Division of Ser. No. 302,531, Sep. 8, 1994, Pat. No. 5,596,463.

[30] Foreign Application Priority Data

Sep. 8, 1993 [JP] Japan ................................ 5-223000
Sep. 27, 1993 [JP] Japan ................................ 5-240077

[51] Int. Cl.$^6$ ........................................ G11B 5/596
[52] U.S. Cl. ........................................ 360/104
[58] Field of Search ........................ 360/103, 104, 360/113, 126, 77.01–78.14, 97.01–99.12, 121

[56] References Cited

U.S. PATENT DOCUMENTS 5,444,589  8/1995  Hu et al. ........................... 360/113

Primary Examiner—Robert S. Tupper
Attorney, Agent, or Firm—Sughrue, Mion, Zinn, Macpeak & Seas, PLLC

[57] ABSTRACT

In a recording/reproduction apparatus equipped with an integrated head comprising a thin film inductive write element and a MR read element and mounted on a head slider which is arranged to be rotatable about a point so as to be rotationally accessible to tracks of a disk serving as a recording medium to make yaw angles with respect to tangents of the tracks, the inductive write element and the MR read element are arranged so that a magnetic center line of the MR read element which extends in directions perpendicular to track crossing directions is separated from a geometric center line of the MR write element which extends in directions perpendicular to the track crossing directions. The separation between the inductive write element and the MR read element is determined as the result of a multiplication of ½ of the sum of the sine of the slider yaw angle with respect to the tangent of the innermost track on the disk and the sine of the slider yaw angle with respect to the tangent of the outermost track by the distance between a gap of the inductive write element and the center of the MR read element. This arrangement allows minimizing the off-track between the write and read modes which occurs due to the yaw angles.

6 Claims, 15 Drawing Sheets

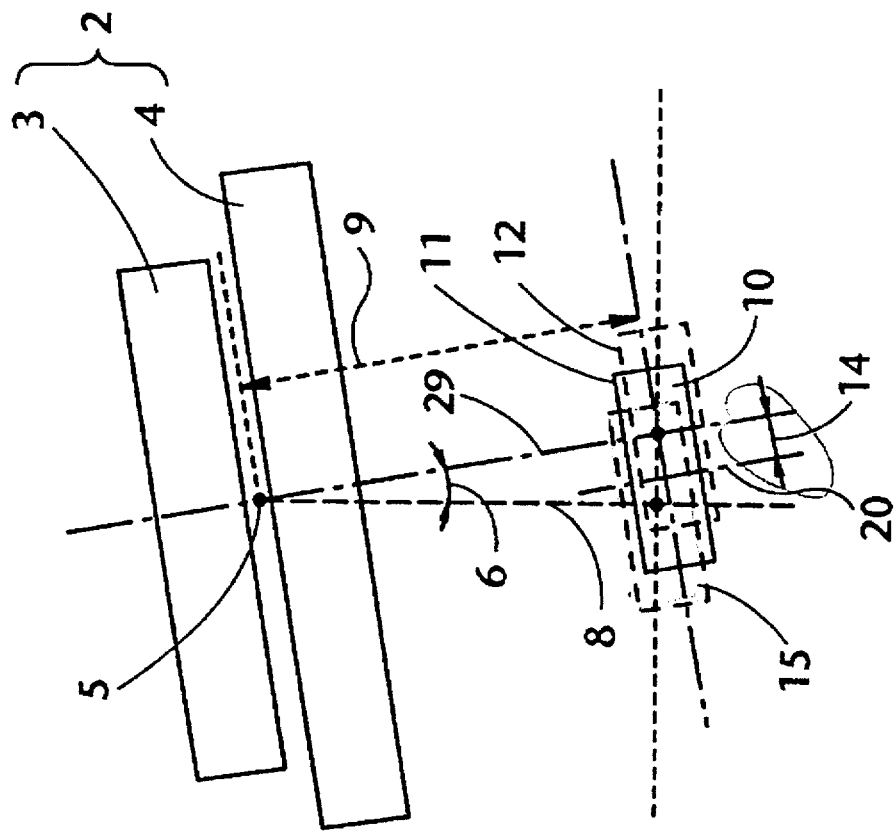
FIG. 7
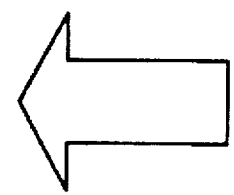
DISK TRAVELING DIRECTION

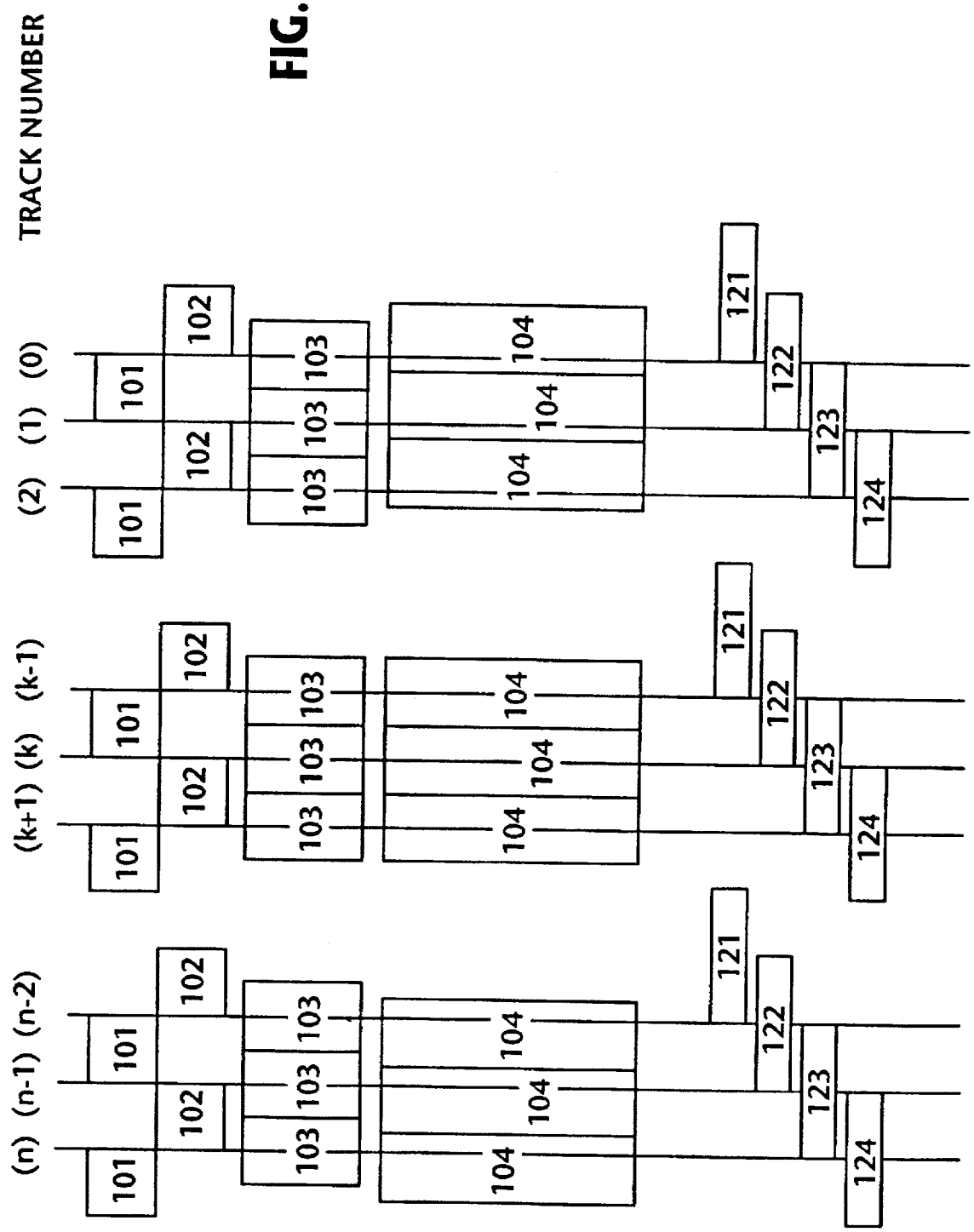

RECORDING/REPRODUCING APPARATUS WITH AN INTEGRATED INDUCTIVE WRITE, MAGNETORESISTIVE READ HEAD

This is a divisional of application Ser. No. 08/302,531 filed Sep. 8, 1994. Now U.S. Pat. No. 5,596,463.

BACKGROUND OF THE INVENTION

The present invention relates to a recording/reproducing apparatus for writing and reading signals on and from a recording medium, and more particularly to an integrated thin film inductive write, magnetoresistive (MR) read head (which will hereinafter be referred to as an integrated head) used in connection with a so-called rotary cylinder comprising a plurality of disk-like recording media rotatably supported on a rotary spindle and to a track arrangement of the disk-like recording medium of the rotary cylinder.

Recently, improvement for signal recording and reproduction systems such as a so-called hard disk apparatus is being made for increasing recording density and promoting write/read efficiency purposes, and an integrated head has been developed which comprises a thin film inductive element for a write mode and an MR element for a read mode and which is mounted on a head slider constructed to float on a so-called air bearing principle. For positioning such an integrated head to one of a plurality of rotary disks coaxially arranged to have a cylindrical configuration as a whole, there is generally being employed a swing type access mechanism comprising a swing arm which carries the head slider with the integrated head at its one end and rotates about the other end so that the integrated head moves to and separates from the rotary disk.

There are some problems which arise with such a recording/reproduction system, however, particularly when using small form factor disks whose diameters are 3.5 inches or less as recording media. A serious problem is an occurrence of a yaw angle (skew misalignment) which arises due to the movement of the integrated head to the disk in an arc made in accordance with the movement of the swing type access mechanism. A large yaw angle reduces the effective track widths on the disk as well as decreasing the floating amount of the head slider. Accordingly, there is a limit to the yaw angle and the limit is desirable to be 15° o to 200°. In addition, there is a separation (generally about 10 μm) in position between the inductive write element and MR read element. Subject to a large yaw angle, the on-track positions of the inductive write element and the MR read element differ from each other between the write and read modes, creating an off-track state. This off-track increases reproduction errors and lowers the throughput. Further, the off-track causes a problem in sector identification and others. In this system the recording into a data field is required to be made immediately after the reading of identification data from an information identification field because the recording and reproduction are made with different heads. When an offset occurs between the magnetic center lines of the MR read element and inductive write element when the yaw angle is relatively large, difficulty is actually encountered to accurately recognize the sector number and others.

Elimination of such an off-track state has been attempted by minimizing the off-track amount at the outermost position of the disk where the yaw angle becomes the largest or reducing the separation between the inductive write element gap and the MR read element. However in fact the offset amount of an information identification field from a data field becomes large in the case of merely minimizing the offset amount so that difficulty is made to recognize an identifier (identification information) to reproduce data, and further there is a limit to the reduction of the separation therebetween from the viewpoint of the recording characteristic of the inductive write element and the shield characteristic of the MR read element.

SUMMARY OF THE INVENTION

It is therefore an object of the present invention to provide a recording/reproduction apparatus which is capable of minimizing the off-track between recording and reproduction due to the occurrence of the slider yaw angle irrespective of the separation between the inductive write element and magnetoresistive read element without sacrificing the track capacity.

This and other objects which will become apparent as the description proceeds. In accordance with the present invention there is provided an arrangement of a thin film inductive write element and a MR read element of an integrated head mounted on a head slider which is arranged to be rotatable about a point so as to be rotationally accessible to tracks of a disk serving as a recording medium to make yaw angles with respect to tangents of the tracks. A feature of this invention is that the inductive write element and the MR read element are arranged so that a magnetic center line of the MR read element which extends in directions perpendicular to track crossing directions is separated from a geometric center line of the MR write element which extends in directions perpendicular to the track crossing directions, and the separation therebetween is determined as the result of a multiplication of ½ of the sum of the sine of the slider yaw angle with respect to the tangent of the innermost track on the disk and the sine of the slider yaw angle with respect to the tangent of the outermost track by the distance between a gap of the inductive write element and the center of the MR read element. When defining the arrangement of the inductive write element and the MR read element by a geometric relationship, the separation between the inductive write element and the MR read element is determined on the basis of ½ of the sum of the sine of the slider yaw angles with respect to the tangents of the innermost and outermost tracks, the distance between a gap of the inductive write element and the center of the MR read element and the height of the MR read element from a surface of the head slider.

Further, according to this invention there is provided an arrangement of information identification fields and data fields in tracks on the disk which is determined in connection with an integrated head comprising a thin film inductive write element and a MR read element. The center lines of the information identification fields which extend in directions perpendicular to track crossing directions are shifted by predetermined distances from center lines of the data fields which extend in directions perpendicular to the track crossing directions so as to make deviations in the track crossing directions between the center lines of information identification fields and the center lines of the data fields. The deviations are determined in accordance with the positional relationship in the track crossing directions between magnetic center lines of the inductive write element and the MR read element so as to vary successively to increase toward the innermost or outermost portion of the disk or increase from the middle portion toward the innermost and outermost portions.

BRIEF DESCRIPTION OF THE DRAWINGS

The object and features of the present invention will become more readily apparent from the following detailed description of the preferred embodiments taken in conjunction with the accompanying drawings in which:

FIG. 7 is an illustration for describing an integrated head according to a first embodiment of this invention;

FIG. 18 is an illustration for describing the relationship in position between servo surface servo signal fields and recording fields when the fifth embodiment is applied to a recording/reproduction system equipped with a head positioning servo surface.

DETAILED DESCRIPTION OF THE INVENTION

Figure 1:
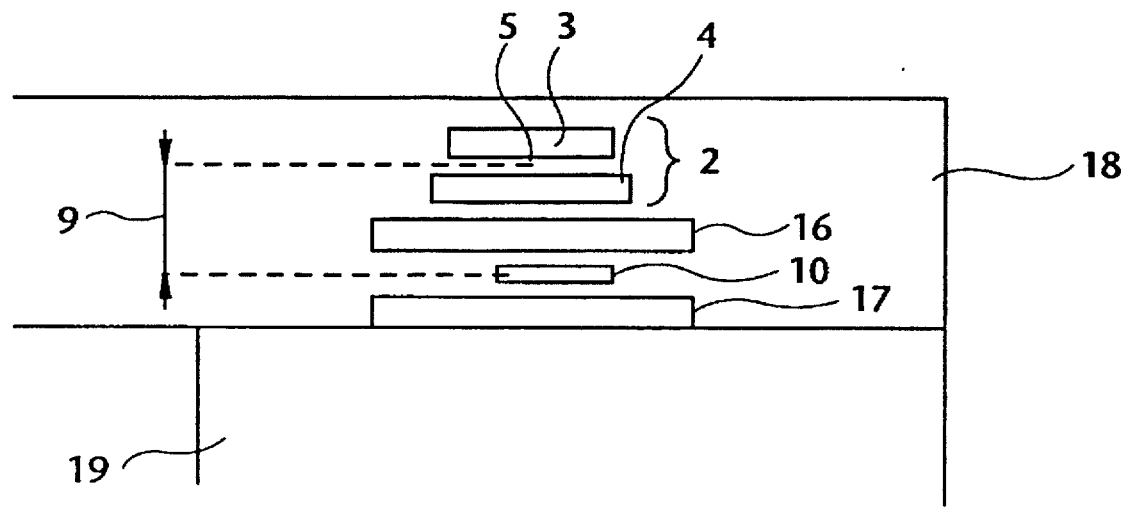
FIG. 1 is a schematic illustration of an arrangement of an integrated head.
Figure 2:
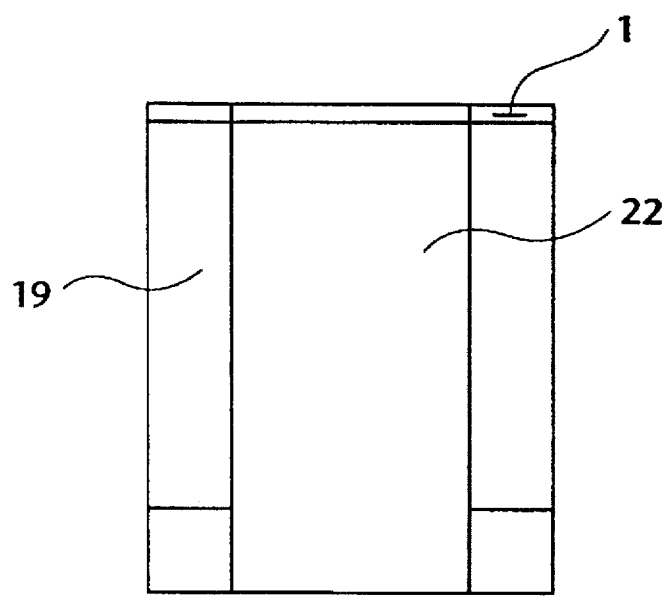
FIG. 2 is an illustration of a head slider equipped with the integrated head.

A description of an integrated head will first be made below with reference to FIGS. 1 and 2 illustrating a structure of the integrated head and illustrating a magnetic head slider which is equipped with the integrated head, respectively. In FIGS. 1 and 2, the integrated head 1 comprises a thin film inductive write element 2 made up of an upper pole section 3 and a lower pole section 4, and an MR read element 10 sandwiched between upper and lower MR shield sections 16 and 17 for reduction of magnetic noises. The upper and lower pole sections 3 and 4 are arranged in parallel to make a magnetic gap 5 therebetween. The inductive write element 2 and the MR read element 10 are located so that the inductive write element gap 5 is separated by a predetermined distance 9 from the center of the MR read element 10. Here, thin film coils and others are omitted for brevity. The integrated head 1 is formed within an alumina protective layer 18 on a trailing edge surface of an air bearing surface (ABS) 19 of a magnetic head slider 22 as schematically shown in FIG. 2. The head slider 22 is arranged so as to float above a disk on the principle of air bearing.

Figure 3:
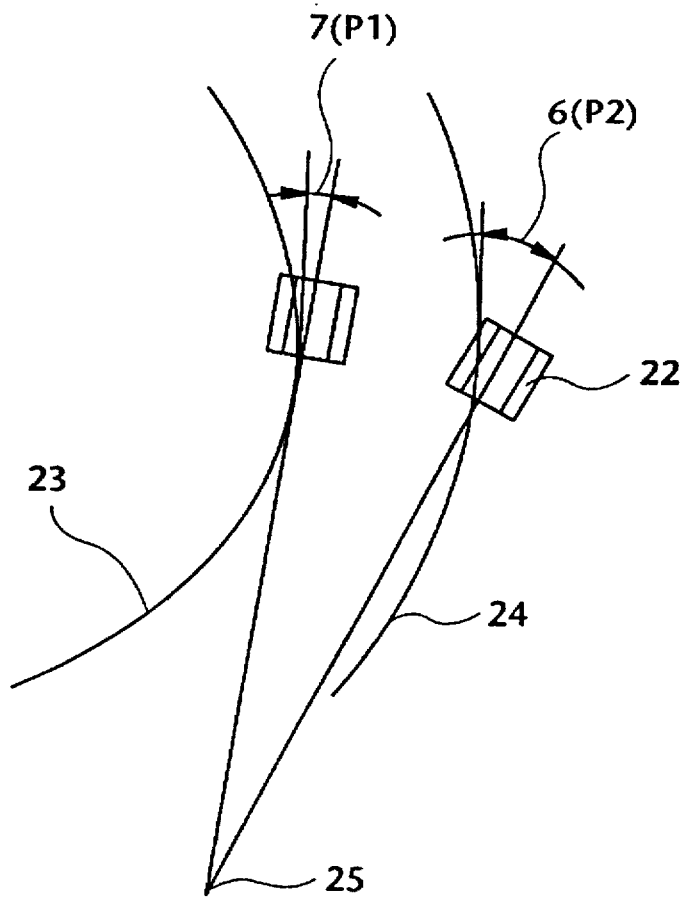
FIG. 3 is an illustration for describing the occurrences of skews of the head slider with respect to a disk.

As illustrated in FIG. 3, the magnetic head slider 22 is arranged to be rotatable about a pivot 25 through a swing type access mechanism (not shown). In the case of driving the magnetic head slider 22 through the swing type access mechanism, when the integrated head 1 reaches the innermost position (including the innermost track) 23 of the disk, an innermost yaw angle (P1) 7 is made between the longitudinal directions (the line connecting the center of the pivot 25 with the center of the magnetic head slider 22) of the magnetic head slider 22 and the geometric tangent of the innermost portion 23 of the disk, and when the integrated head 1 is at the outermost position (including the outermost track) 24 of the disk, an outermost yaw angle (P2) 6 also occurs between the longitudinal directions of the magnetic head slider 22 and the geometric tangent of the outermost portion 24 thereof. Here, the yaw angle is measured clockwise with respect to the track tangent so as to take plus and minus signs.

Figure 4:
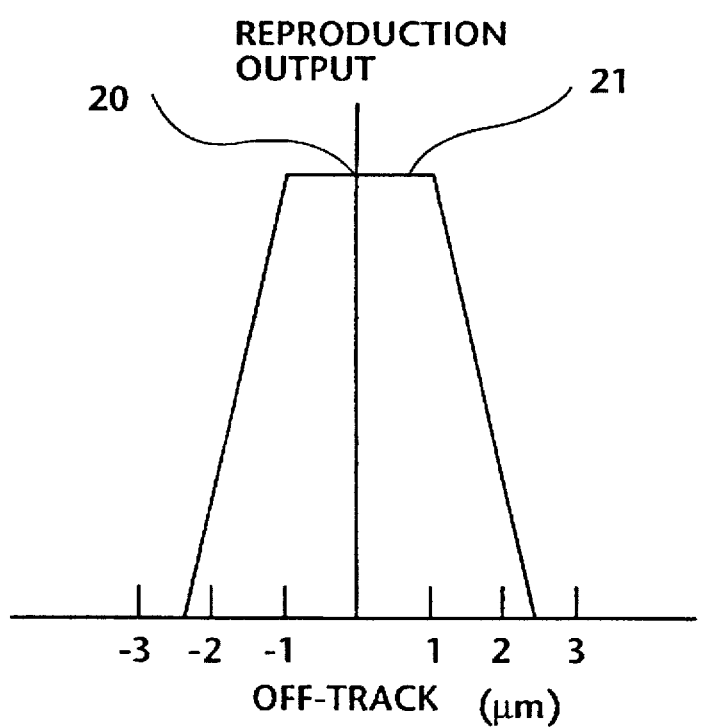
FIG. 4 shows an reproduction characteristic of an MR read element for describing a magnetic center of the MR read element.

FIG. 4 shows an ideal off-track characteristic of the MR read element 10, wherein the horizontal axis indicates the off-track amount and the vertical axis denotes the reproduction output from the MR read element 10. In the integrated heads, for improving the off-track characteristic the width (track width) of the inductive write element upper pole section 3 is generally set to be larger than the width of the MR read element 10, and hence the reproduction output of the MR read element 10 with respect to the off-track mount varies to form a trapezoid as illustrated in FIG. 4. In this case, the magnetic center line 20 of the MR read element 10 corresponds to a center of the maximum output portion 21 of the trapezoidal off-track characteristic.

Figure 5:
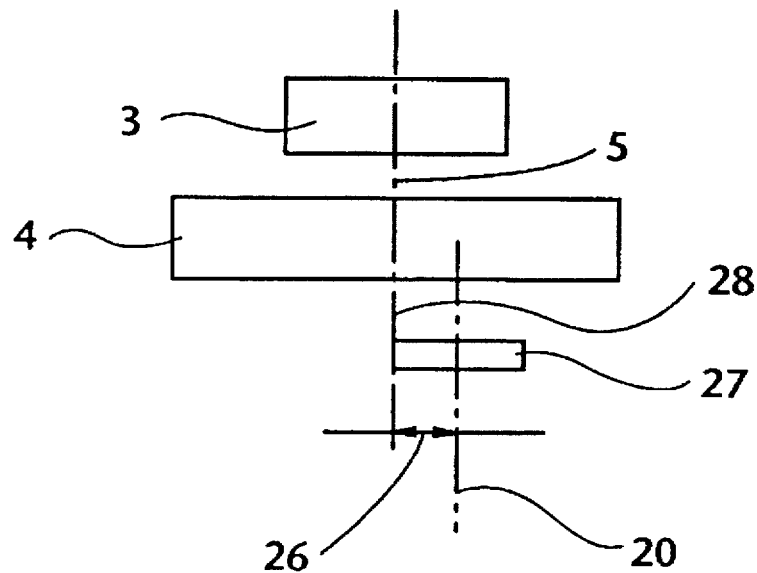
FIG. 5 is an illustration for describing a magnetic relationship between a thin film inductive write element and an MR read element.
Figure 6:
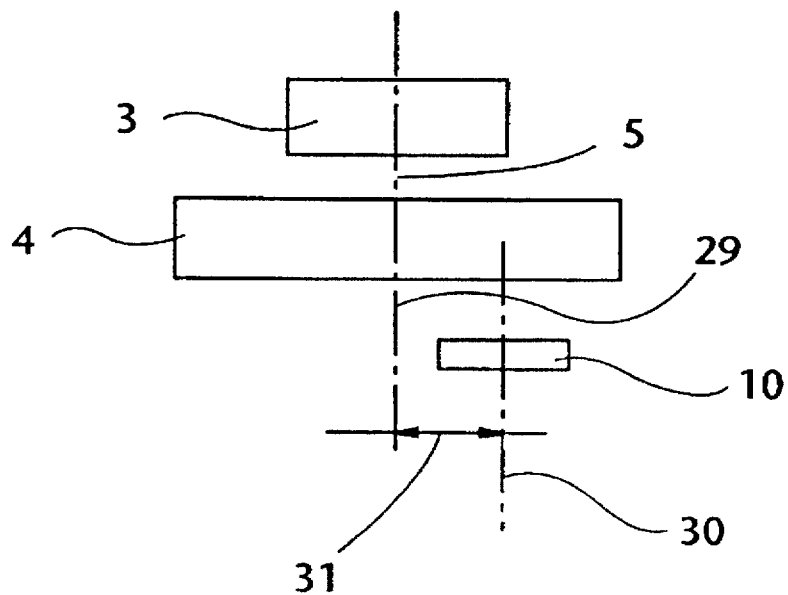
FIG. 6 is an illustration for describing a geometric relationship between a thin film inductive write element and an MR read element.

FIG. 5 shows the relationship in magnetic position between the inductive write element 2 and the MR read element 10. In FIG. 5, numeral 28 indicates a magnetic center line 28 of the inductive write element 2 and numeral 20 denotes a magnetic center line 20 of the MR read element 10. The magnetic center line 28 of the inductive write element 2 can be considered to be coincident with the geometric center line thereof if assuming that the asymmetries of the head erase bands and fringings are extremely small. The magnetic center line 20 of the MR read element 10 is shown on the assumption that the MR read element 10 is at the on-track position corresponding to the center of the maximum reproduction output portion 21 as illustrated in FIG. 4. In this case, an offset (slippage) amount 26 in the track crossing directions between the magnetic center line 28 passing through the inductive write element gap 5 and the magnetic center line 20 of the MR read element 10 is defined as a magnetic difference between the write and read modes. On the other hand, FIG. 6 shows a slippage between the geometric center line 29 passing through the inductive write element gap 5 and the geometric center line 30 of the MR read element 10. This offset is defined as a geometric difference 31 between the write and read modes different from the magnetic difference 26 in FIG. 5.

FIG. 7 is a schematic illustration of an integrated head according to a first embodiment of this invention when being viewed from the disk side and when being at an outermost position of a disk traveling in the direction indicated by an arrow. In FIG. 7, the MR read element 10 is placed at a position separated by a distance (S) 9 from the head gap 5 of the inductive write element 2 toward the ABS 19 side. When the inductive write element 2 is taking an on-track state in a write mode, the center line 29 of the inductive write element 2 is coincident with the center line 8 of a data track on the disk which extends in parallel to the disk traveling direction. On the other hand, although being originally arranged to coincide with the magnetic center line 29 of the inductive write element 2, due to occurrence of the yaw angle 6 at the outermost position of the disk, the magnetic position of the MR read element 10 is shifted and offset to the inner side (to the right side in the illustration) of the disk as illustrated at numeral 12. This offset distance from the center line 8 of the data track assumes the result (solution) of a multiplication of the separation 9 by the sine of the outermost yaw angle 6. Here, calculating under the condition that the innermost yaw angle=0°, the outermost yaw angle=15° and the separation=8 microns, the offset distance becomes about 2 microns which cannot actually be ignored considering the recent high-density recording. On the other hand, if setting the magnetic position of the MR read element 10 at an on-track position 15 in consideration of immediately entering into a read mode, when the integrated head 1 is moved up to the innermost position of the disk with the separation 9 between the inductive write element 2 and the MR read element 10 being fixed, an offset of the magnetic position of the MR read element 10 toward the outer side of the disk similarly develops by the result of a multiplication of the sine of the innermost yaw angle 7 by the separation 9.

For improving these points, the first embodiment of this invention features the following arrangement of the integrated head. That is, the relationship in magnetic position between the inductive write element 2 and the MR read element 10 is determined on the basis of a multiplication of ½ of the sum of the sine of the innermost yaw angle 7 and the sine of the outermost yaw angle 6 by the geometric separation 9 between the inductive write element 2 and the MR read element 10. More specifically, further referring to FIG. 5 the inductive write element 2 and the MR read element 10 are placed so that the positional difference 26 in the track crossing directions between the magnetic center lines 28 and 20 of the inductive write element 2 and the MR read element 10 substantially becomes equal to the result of a multiplication of ½ of the sum of the sine of the innermost yaw angle 7 and the sine of the outermost yaw angle 6 by the geometric separation 9 between the inductive write element 2 and the MR read element 10. When expressing the positional difference OFFSET between the elements 2 and 10 by an equation, it becomes as follows:

$$\text{OFFSET} = \tfrac{1}{2} \times \{\sin(P1) + \sin(P2)\} \times S \quad (1)$$

where P1=the slider yaw angle at the innermost track, P2=the slider yaw angle at the outermost track, sin(P1)=the sine of the slider yaw angle P1, sin(P2)=the sine of the slider yaw angle P2, and S=the separation between the magnetic gap 5 of the inductive write element 2 and the center of the MR read element 10.

When ½×{sin(P1)+sin(P2)} is defined as an angle offset value P, the above-mentioned equation (1) becomes P×S.

Here, according to a study, the angle difference from the innermost portion to the outermost portion is desirable to be between 10° to 25°, and hence the value P of ½×{sin(P1)+ sin (P2)} is preferable to be substantially 0.175 to 0.423.

With the above-mentioned arrangement, as shown at numeral 11 in FIG. 7, the magnetic position of the MR read element 10 can be corrected so that the magnetic center line 20 thereof get closer by a distance 14 to the center line of the data track 8 as compared with the center line 29 of the magnetic position 12. This correction can halve the above-mentioned offset to be about 1 micron according to the calculation under the above-mentioned conditions. This value can substantially correspond to the side guard band of the integrated head and almost allows reading the ID sector without off-track in the write/read modes to thus improve the read error irrespective of a large yaw angle. As a result of this arrangement, the off-track amount becomes at a minimum (about zero) at the vicinity of a middle point between the outermost and innermost positions of the disk and increases in accordance with the movement of the integrated head 1 toward the innermost and outermost positions of the disk along the track crossing directions. Although taking different signs, the absolute values of the offsets (maximum values) of the MR read element 10 at the outermost and innermost positions of the disk substantially become equal to each other.

Figure 8:
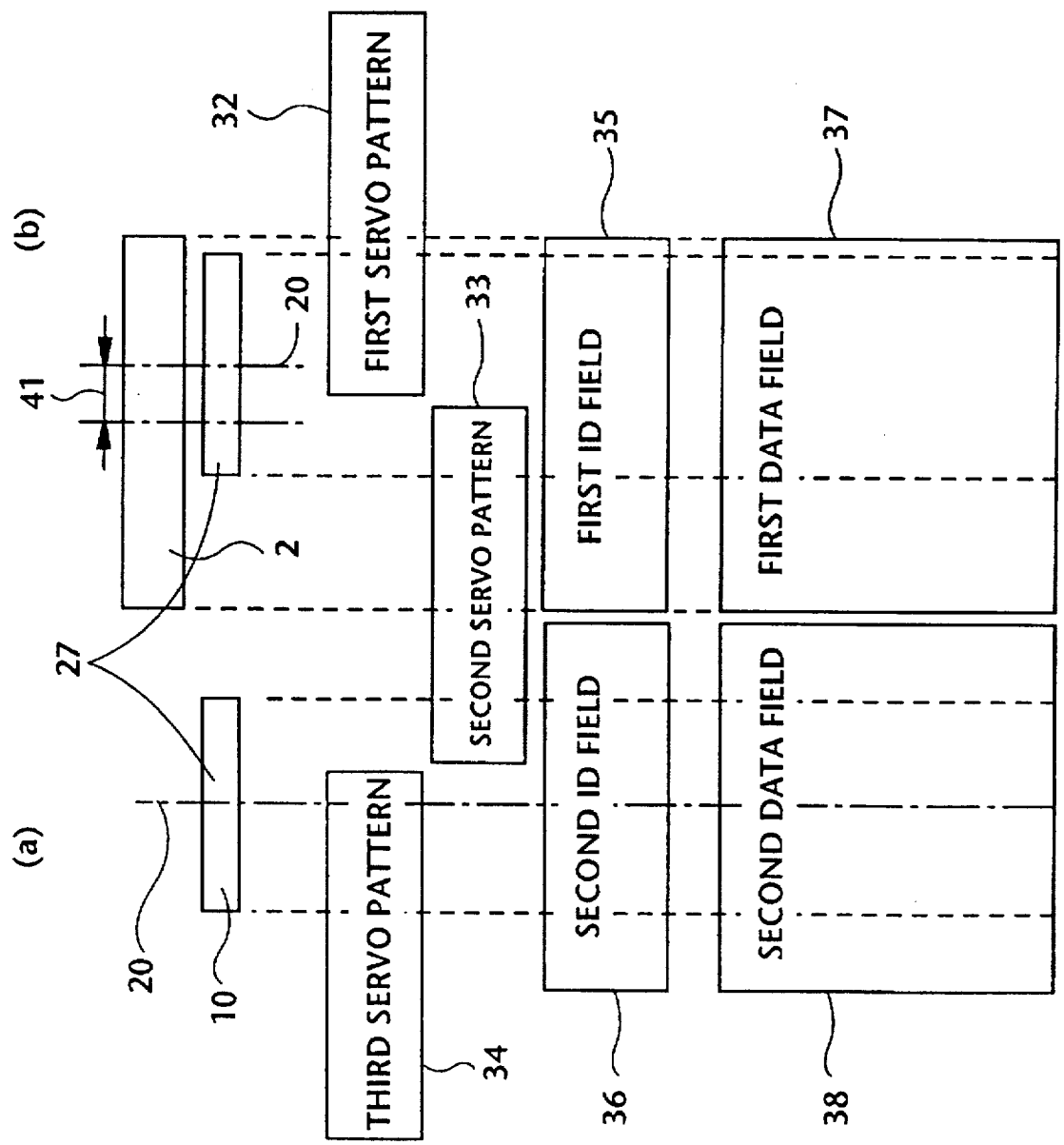
FIGS. 8 to 10 are illustrations for describing the relationship between tracks of a disk and the integrated head according to the embodiment of this invention.

The off-track characteristic in the write/read modes according to the embodiment of this invention will be described with reference to FIGS. 8 to 10 wherein numeral 32 to 34 represent first to third servo patterns, respectively, 35 and 36 designate first and second information identification (ID) fields, respectively, 37 and 38 denote first and second data fields, respectively, and 41 expresses the off-track between the inductive write element 2 and the MR read element 10 in the write mode. The description will be made under the representative conditions that the track pitch=6.2 μm, write track width=6.2 μm, MR read element track width=3.6 μm, separation between the inductive write element gap and the MR read element =7.4 μm, yaw angle at the vicinity of the innermost track=0°, and yaw angle at the vicinity of the outermost track=15°. The descriptions of other embodiments to be described hereinafter will be made under the same conditions. Under these conditions, according to this embodiment the offset amount between the magnetic center lines 28 and 20 of the inductive write element 2 and the MR read element 10 becomes about 1 μm. FIG. 8 shows the relationship in position between the inductive write element 2 and the MR read element 10 at the vicinity of the innermost track wherein (a) indicates the positional relationship in the read mode (the inductive write element 2 is omitted) and (b) represents the positional relationship in the write mode or at the time of switching between the write/read modes for an adjacent sector. As illustrated in (a) of FIG. 8, for minimizing the off-track in the read mode the magnetic center line 20 of the MR read element 10 is required to be coincident with the center line of the second data field 38, and as illustrated in (b) of FIG. 8, when taking an on-track state in the write mode, the center line 28 of the inductive write element 2 is coincident with the center line of the first data field 37. When generally performing the write operations, the ID field which includes sector information and cylinder information is required to be recognized by the MR read element 10 before recording data, and hence the MR read element 10 is required to simultaneously maintain the on-track state over at least the ID field even at the time that the inductive write element 2 is in the on-track state. According to this embodiment, since the offset amount is only about 1 μm, considering the width of the track the MR read element 10 can also take the on-track state over the first ID field 35, thereby preventing reproduction errors. Here, when performing the head positioning on the basis of sector servo information or the like during these operations, a single-phase position error signal consisting of the first and second servo patterns 32 and 33 is used in the write mode, and in this case the positioning is carried out so that the offset is 0.5 μm. Similarly in the read mode the positioning is carried out on the basis of the second and third servo patterns 33 and 34 so that the offset is 0.5 μm in the opposite direction.

Figure 9:
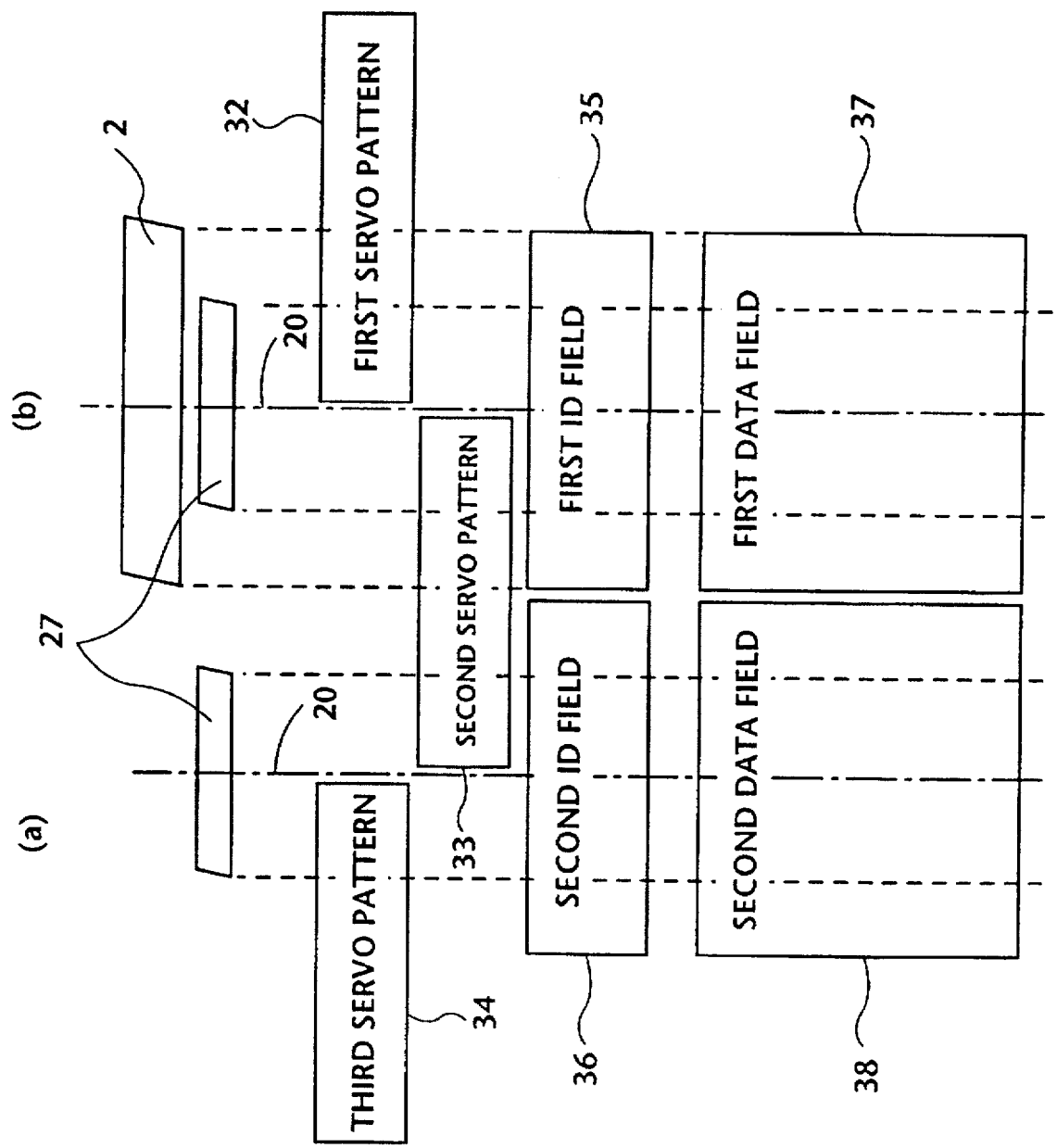

Secondly, in FIG. 9 illustrating the head positions when performing the write/read operations at the vicinity of a middle track on the disk, in the read mode (the inductive write element 2 is omitted as well as in FIG. 8), the physical yaw angle becomes 7.5°, while the center line 20 of the magnetic position 27 of the MR read element 10 is coincident with the center line 28 of the inductive write element 2. Thus, in both the write and read modes the off-track margins become at a maximum with respect to the ID field and data field.

Figure 10:
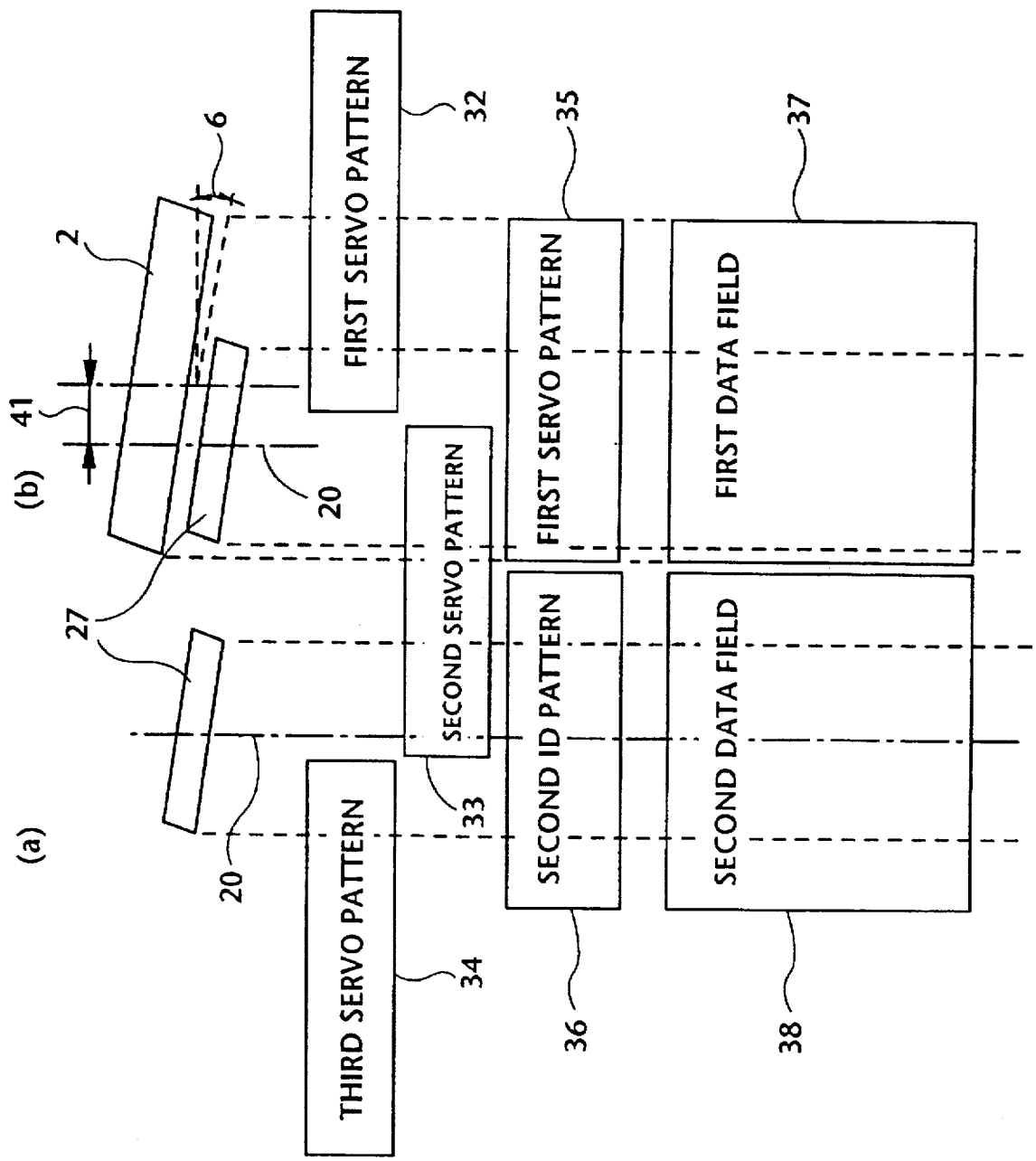

Further, FIG. 10 illustrates the head positions when performing the write/read operations for the adjacent tracks at the vicinity of the outermost position of the disk. Although in this case the yaw angle becomes as large as 15°, the magnetic position 27 of the MR read element 10 takes the off-track state only by 1 μm toward the inner side of the disk when viewed from the inductive write element 2, thus giving a sufficient off-track margin with respect to the first ID field 35 and the first data field 37.

Figure 11:
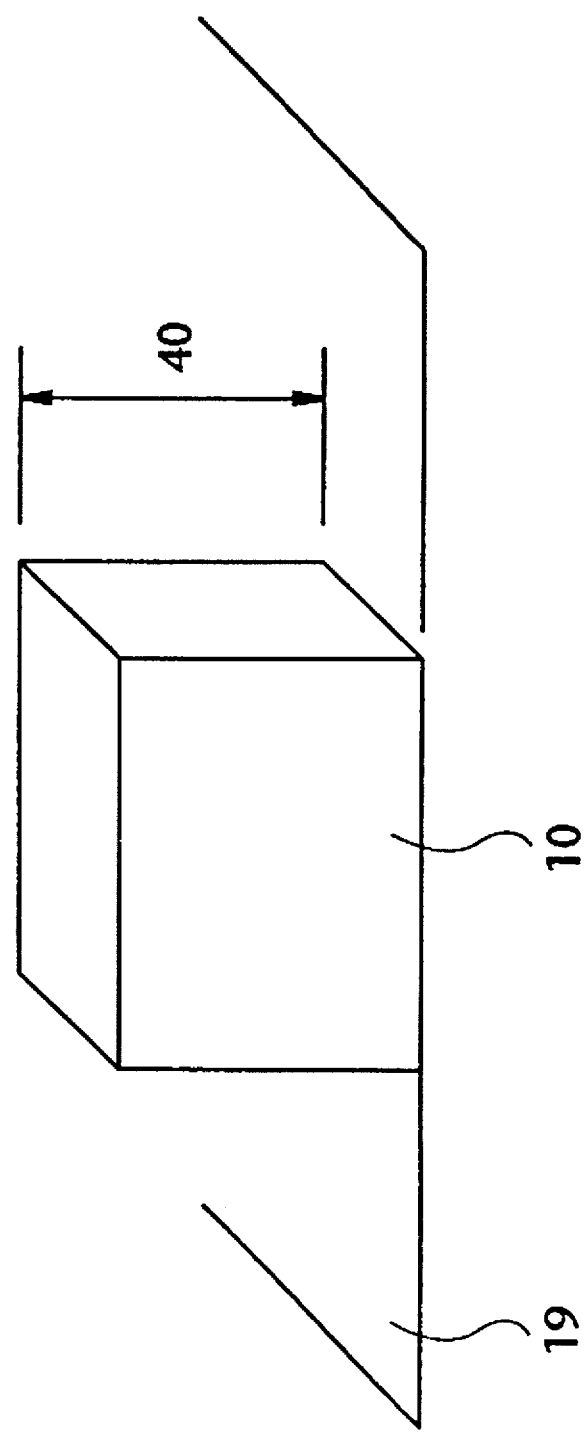
FIG. 11 is a perspective view for describing an integrated head according to a second embodiment of this invention.

Secondly, a modification of the above-mentioned first embodiment of this invention will be described below as a second embodiment of this invention. Although in the first embodiment the arrangement is made on the basis of the magnetic relationship between the inductive write element 2 and the MR read element 10, in the second embodiment it is determined on the basis of the geometric offset between the inductive write element 2 and the MR read element 10. As described above, in the inductive write element 2 the magnetic center line is substantially coincident with the geometric center line, while in the MR read element 10 they are not coincident with each other and deviated from each other in the off-track directions (track crossing directions) because the magnetic flux reading direction is inclined by a certain angle (generally 45°) with respect to the ABS 19. However, the deviation of the magnetic center line of the MR read element 10 from the geometric center line thereof is known to be substantially ¼ of the MR read element height 40 from the ABS 19 as illustrated in FIG. 11 and, although the deviation amount is constant, the deviating direction inverts from the inner side of the disk to the outer side thereof or vise versa along the track crossing directions in accordance with the direction (polarity) of the signal detection sense current flowing in the MR read element 10. Accordingly, the arrangement of the integrated head 1 can be made using the MR read element height 40 on the basis of the relationship in geometric position between the inductive write element 2 and the MR read element 10 instead of the relationship in magnetic position therebetween. The relationship in geometric position between the inductive write element 2 and the MR read element 10 in this second embodiment can be defined as follows in accordance with the sense current direction. That is, the geometric offset between the inductive write element 2 and the MR read element 10 is defined as a value obtained by multiplying ½ of the sum of the sine of the slider yaw angle P1 at the innermost track and the sine of the slider yaw angle P2 at the outermost track by the separation 9 between the magnetic gaps 5 of the inductive write element 2 and the center of the MR read element 10 and by adding ¼ of the MR read element height 40 to the result of the multiplication. Further, the geometric offset therebetween can be defined to be a value obtained by multiplying ½ of the sum of the sine of the slider yaw angle P1 at the innermost track and the sine of the slider yaw angle P2 at the outermost track by the separation 9 between the magnetic gap 5 of the inductive write element 2 and the center of the MR read element 10 and by subtracting ¼ of the MR read element height 40 from the result of the multiplication.

When expressing the geometric offsets OFFSET by equations, they become as follows.

$$\text{OFFSET}=\tfrac{1}{2}\times\{\sin(P1)+\sin(P2)\}\times S+\tfrac{1}{4}\times H \quad (2)$$

$$\text{OFFSET}=\tfrac{1}{2}\times\{\sin(P1)+\sin(P2)\}\times S-\tfrac{1}{4}\times H \quad (3)$$

where: $\sin(P1)$=the sine of the slider yaw angle P1 at the innermost track; $\sin(P2)$=the sine of the slider yaw angle P2 at the outermost track; S=the separation between the magnetic gap 5 of the inductive write element 2 and the MR read element 10; and H=the height of the MR read element 2.

When $\tfrac{1}{2}\times\{\sin(P1)+\sin(P2)\}$ is defined as an angle offset value P as well as in the above-mentioned equation (1), the equations (2) and (3) becomes $P\times S+\tfrac{1}{4}\times H$ and $P\times S-\tfrac{1}{4}\times H$.

Here, the integrated head 1 can be arranged so that the result of a multiplication of ½ of the sum of the sine of the slider yaw angle P1 at the innermost track and the sine of the slider yaw angle P2 at the outermost track by the separation S between the magnetic gap 5 of the inductive write element 2 and the center of the MR read element 10 is equal to ¼ of the height H of the MR read element 5 to satisfy the following equation (4):

$$\tfrac{1}{2}\times\{\sin(P1)+\sin(P2)\}\times S=\tfrac{1}{4}\times H \quad (4)$$

In this case, from the above-mentioned equation (3), the offset OFFSET between the geometric center lines of the inductive write element 2 and the MR read element 10 substantially becomes zero.

As well as the above-described first embodiment this second embodiment determines the positional relationship in the track crossing directions between the inductive write element 2 and the MR read element 10 on the basis of the head slider skew and can provide the effect similar to that of the first embodiment.

Figure 12:
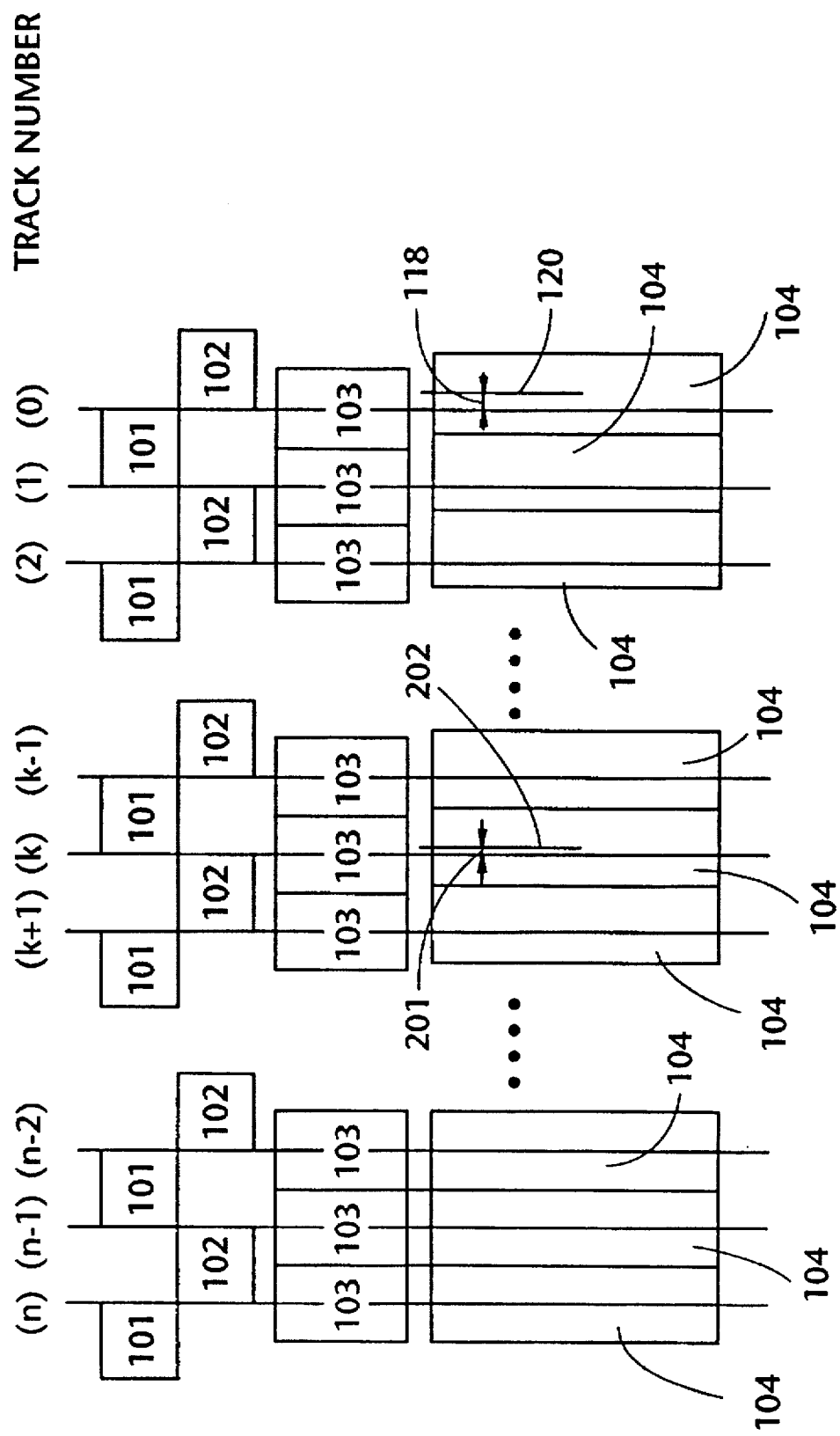
FIG. 12 illustrates a track layout on a disk of a rotary cylinder according to a third embodiment of this invention.

Further, a description of a third embodiment of this invention will be described below with reference to FIG. 12. This third embodiment is for compensating for the offset problem between the inductive write element 2 and the MR read element 10 with an arrangement of a disk track. More specifically, the relationship in position between information identification fields and data fields of tracks on a disk is make in connection with the relationship in magnetic position between the inductive write element 2 and the MR read element 10 in the track crossing directions as illustrated in FIG. 5. FIG. 12 schematically illustrates a track layout of a disk of a rotary cylinder according to the third embodiment of this invention and showing three tracks at each of three representative portions of the disk. Here, the three representative portions of the disk mean the innermost portion covering about 10 tracks including the innermost track (n), the middle portion ranging over about 10 tracks including the middle track (k) and the outermost portion comprising about 10 tracks including the outermost track (0). In accordance with the general manner the tracks are numbered as the number of the outermost rack is (0). In FIG. 12, each of the tracks comprises a first servo signal field 101, a second servo signal field 102, an information identification field 103 and a data field 104. The information identification field 103 is provided for identifications of track information, sector information and others. The outermost track (0) exists on a line where the level of the position error signal from the first and second servo signal fields 101 and 102 becomes the lowest, and the line passes through the center of the information identification field 103. Between the line and the center line 120 of the data field 104 of the outermost track (0) there is made a deviation 118 corresponding to a positional difference between the data and information identifier of the outermost track (0). The deviation 118 is made so that the information identification field 103 is shifted toward the inner side when being viewed from the data field 104. The value of the deviation 118 is determined on the basis of the relationship in magnetic position between the inductive write element 2 and the MR read element 10 at the outermost track (0) so as to get an adequate off-track characteristic. Further, in the middle track (k) a deviation is also made between a data field 104 and an information identification field 103. That is, in the middle track (k) the center line 202 of the data field 104 is shifted by a distance 201 from the center line of the information identification field 103 so that the information identifier is shifted toward the inner side when viewed from the data field 104. This deviation 201 is set to be smaller than the above-mentioned deviation 118. On the other hand, in the innermost track (n) the center line of the information identification field 103 is arranged to be coincident with the center line of the data field 104. That is, the deviation is set to be zero. Here, as obvious from the above description, taking into account the fact that the slider yaw angle varies in accordance with the positions of the disk, the deviation between the information identification field 103 and the data field 104 is arranged to successively vary in accordance with the positions of the disk. Thus, the deviations are made in accordance with the positional offsets in the track crossing directions between magnetic center lines of the inductive write element 2 and the MR read element 10 on the disk.

Figure 13:
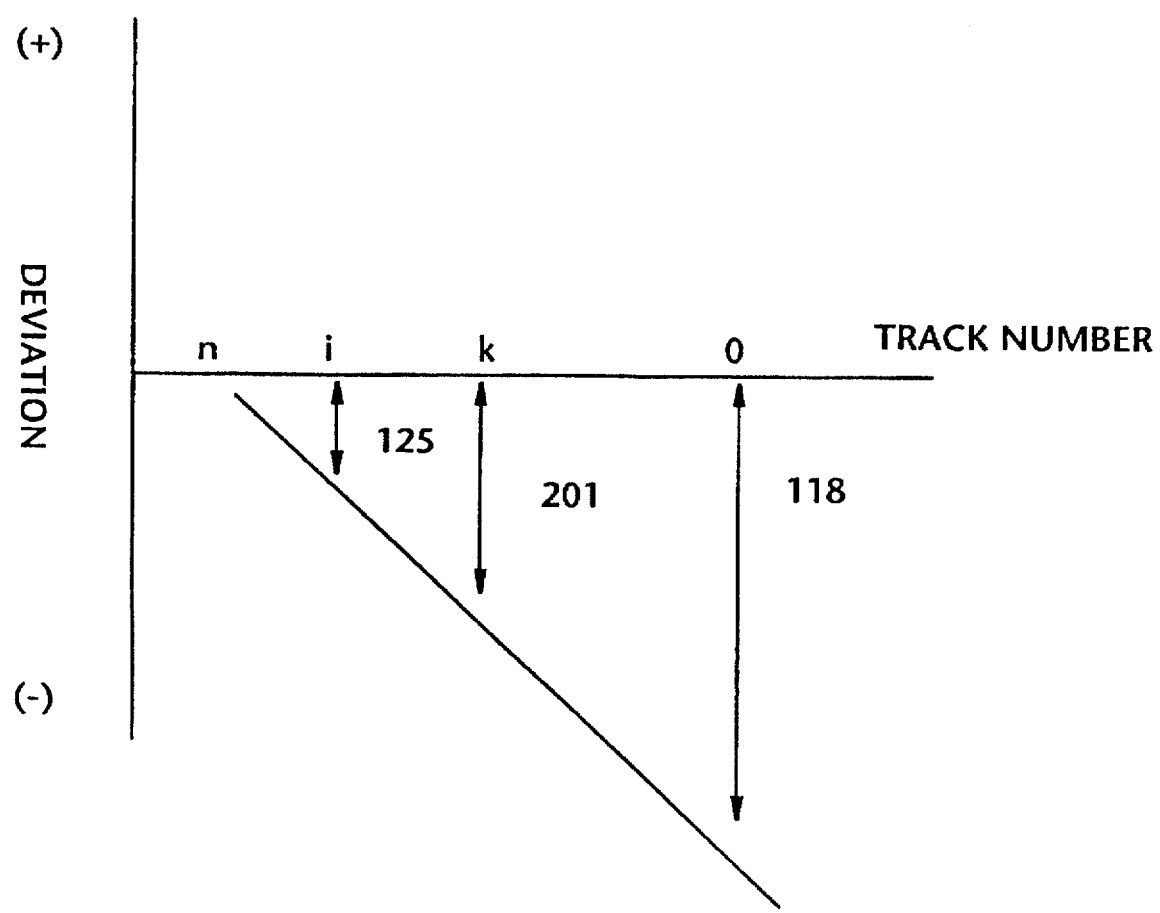
FIG. 13 is a graphic illustration for describing deviations between an information identification field and a data field at every position of a disk in the third embodiment.

FIG. 13 shows deviations between the information identification fields 103 and the data fields 104 at every position of the disk, where a deviation 125 for the track (i) is shown in addition to the above-mentioned deviations 118 and 201 for the outermost track (0) and the middle track (k). As shown in FIG. 13, the respective deviations are determined by the linear interpolation after determining, for example, the deviation of the outermost track and the deviation of the innermost track (which is zero in this embodiment). When taking into account the head positioning servo revolving power and the fact that the variation of the deviation is extremely small because a large number of tracks are provided for improvement of the recording density, it is possible that the deviations can be made to successively vary stepwise in accordance with the linear interpolation. Here, the deviations are not always required to be determined completely in accordance with the linear interpolation and each of data zones on the disk which are divided on the basis of the recording/reproducing frequency or the like can also be arranged to have a constant deviation so that the deviations successively vary stepwise in accordance with the linear interpolation as a whole. In this case, the average deviation of each data zone is treated as a typical value.

For recognizing the information identification field 103 the MR read element 10 is required to take an on-track state on the information identification field 103 as accurately as possible, and in the information recording mode the information identification field 103 is required to be recognized by the MR read element 10 immediately before recording data at a predetermined place. However, the time period allowed for the data recording after the recognition of the information identification field is short and hence difficulty is actually encountered to mechanically compensate for the above-mentioned positional deviation between the inductive write element 2 and the MR read element 10. According to the third embodiment the information identification fields 103 are shifted to the inner side of the disk with respect to the data fields 104, and hence, even if the yaw angle is large, the recording can be carried out by the inductive write element 2 immediately after recognizing the information identifier.

Figure 14:
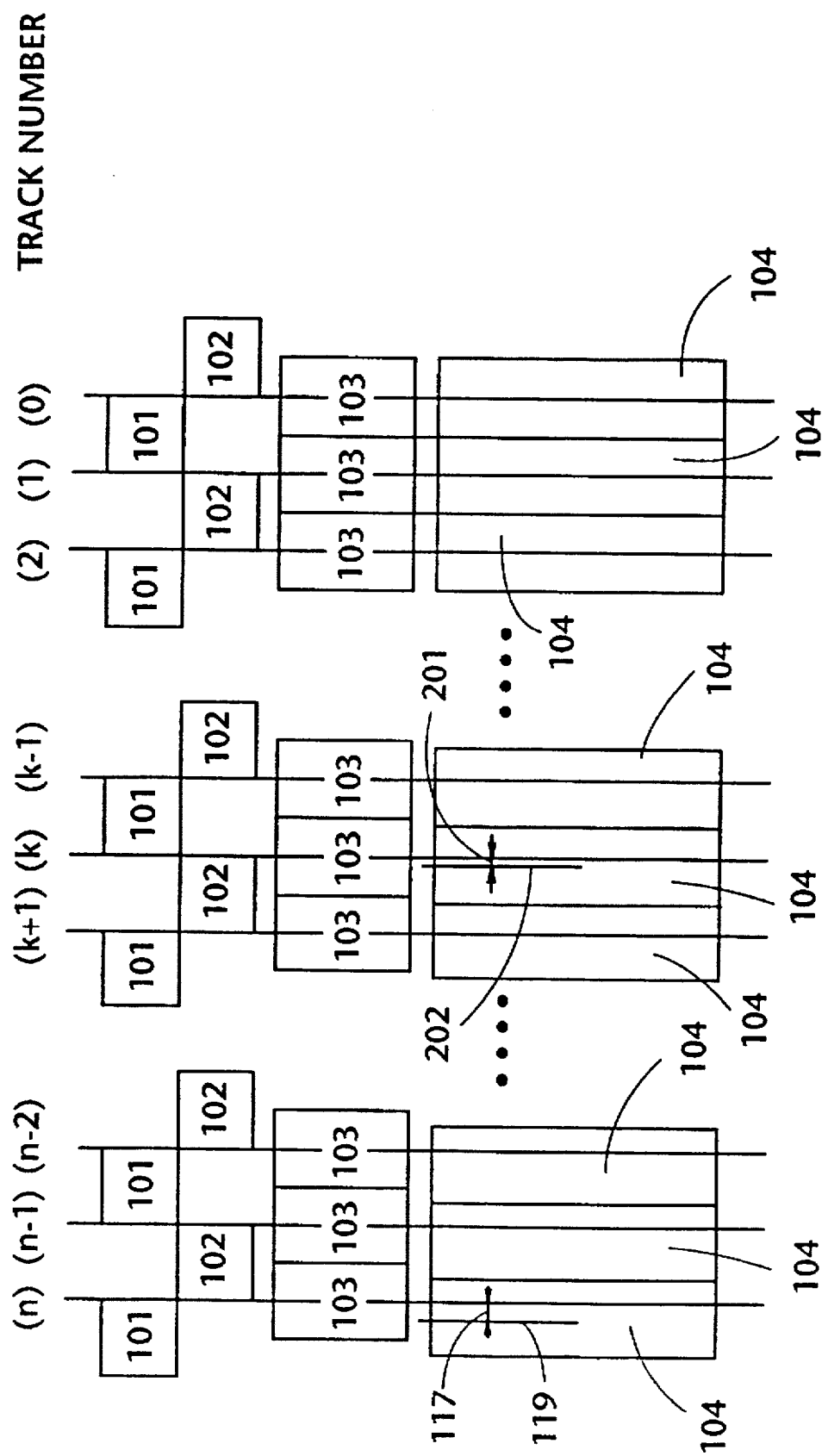
FIG. 14 shows a track layout on a disk according to a fourth embodiment of this invention.

Further, a description of a fourth embodiment of this invention will be made with reference to FIG. 14 showing another track layout on a disk. A feature of this fourth embodiment is that the deviations are arranged to vary so as to increase in the opposite direction to that of the above-described third embodiment. In FIG. 14, the innermost track (n) is on a line where the level of the position error signal from first and second servo signal fields 101 and 102 becomes the lowest, and the line passes through the center of the information identification field 103. Between the line and the center line 119 of the data field 104 of the innermost track (n) there is a deviation 117 which is a positional difference between the data and an information identifier. The deviation 117 is made so that the information identification field 103 is shifted toward the outer side with respect to the data field 104. Further, in the middle track (k) a deviation is also made between the data field 104 and information identification field 103. That is, the center line 202 of the data field 104 is shifted from the center line of the information identification field 103 by a distance 201 set to be smaller than the above-mentioned deviation 117. On the other hand, in the outermost track (0) the center line of the information identification field 103 is arranged to be coincident with the center line of the data field 104. This means that the deviation here becomes zero, and if the magnetic center of the MR read element 10 is arranged to be coincident with the center line of the data track, it is obvious that the off-track between the inductive write element 2 and the MR read element 10 does not occur at the outermost position.

Figure 15:
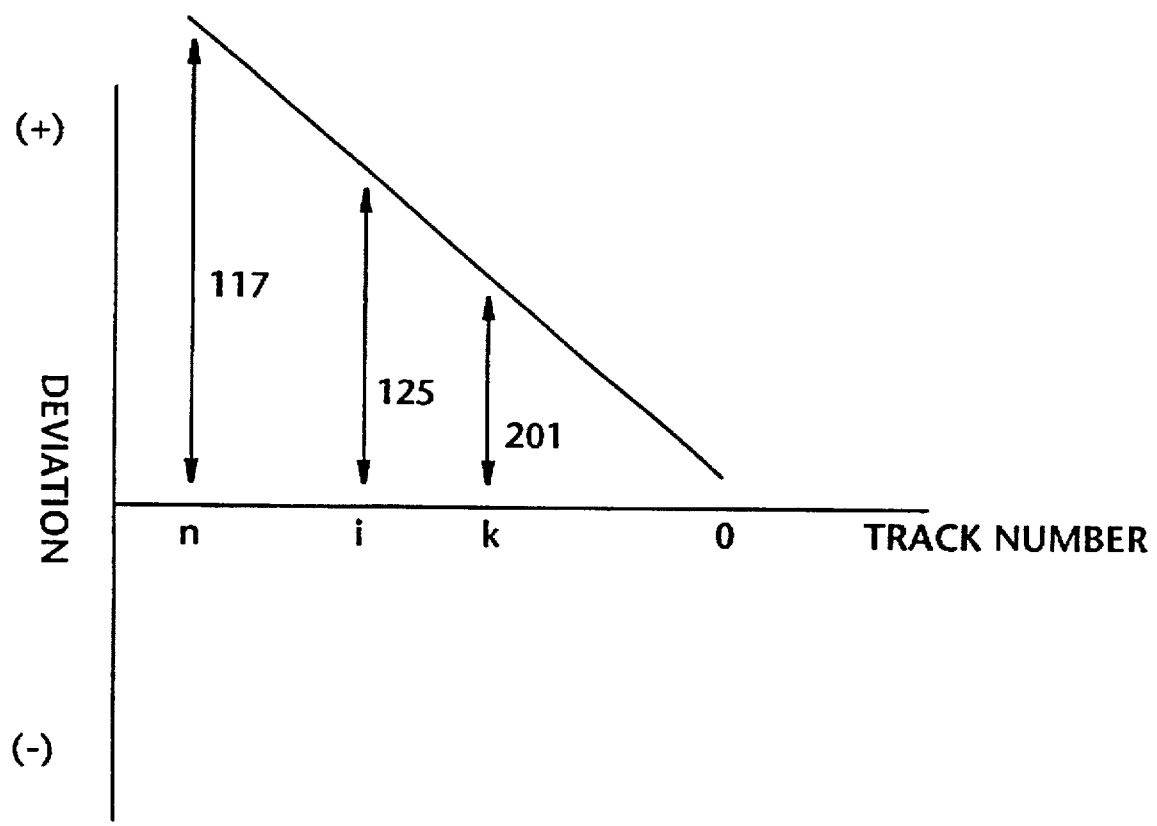
FIG. 15 is a graphic illustration for describing deviations between an information identification field and a data field at every position of a disk in the fourth embodiment.

As well as the above-described third embodiment the respective deviations can be determined by the linear interpolation after determining the deviation 117 of the innermost track and the deviation of the outermost track (which is zero in this embodiment) as illustrated in FIG. 15 so as to be in relation to or substantially in proportion to the magnetic differences between the inductive write element 2 and the MR read element 10. Here, the deviations are not always required to be determined completely in accordance with the linear interpolation and each of data zones on the disk which are divided on the basis of the recording/reproducing frequency or the like can also be arranged to have a constant deviation so that the deviations successively vary stepwise in accordance with the linear interpolation as a whole.

Figure 16:
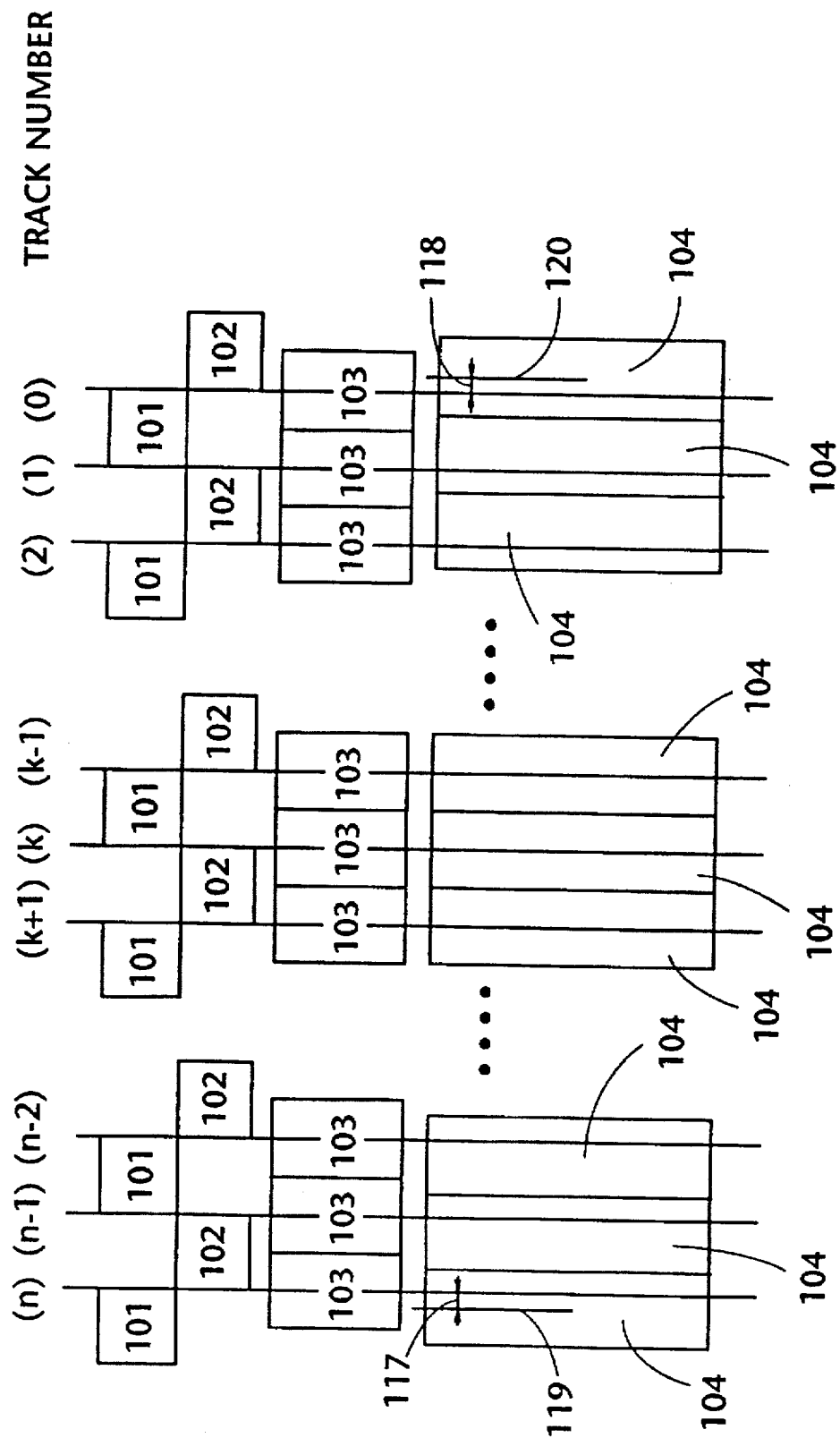
FIG. 16 shows a track layout on a disk according to a fifth embodiment of this invention.

A description of a fifth embodiment of this invention will be made with reference to FIG. 16. A feature of this fifth embodiment is that the deviations are arranged to vary to increase from the middle portion of a disk toward the innermost and outermost portions thereof. In FIG. 16, similarly the innermost track (n) is on a line where the level of the position error signal from first and second servo signal fields 101 and 102 becomes the lowest, and the line passes through the center of the information identification field 103. Between the line and the center line 119 of the data field 104 of the innermost track (n) there is a deviation 117 which is a positional difference between the data and an information identifier. The deviation 117 is made so that the information identification field 103 is shifted toward the outer side with respect to the data field 104. Further, in the outermost track (0) a deviation 118 is set between the center line 120 of the data field 104 and the center line of the information identification field 103. On the other hand, in the middle track (k)

the center line of the information identification field 103 is arranged to be coincident with the center line of the data field 104. The deviation here is zero.

According to this fifth embodiment, the off-track between the inductive write element 2 and the MR read element 10 at the innermost and outermost portions of the disk can be reduced as compared to the values (about 2 microns under the above-mentioned conditions) in the third and fourth embodiments. The off-track amount at the innermost portion can be set between zero and the result of a multiplication of the separation (the distance between the magnetic gap 5 of the inductive write element 2 and the center of the MR read element 10) S by the sine of the slider yaw angle P1 at the innermost portion, and the off-track amount at the outermost portion can be set to be between zero and the result of a multiplication of the separation S by the slider yaw angle P2 at the outermost portion. Thus, when the absolute values of the deviations of the information identification fields 103 at the innermost and outermost portions are arranged to be equal to each other and the deviations thereof are arranged to be ½ of the offset amount in the track crossing directions between the magnetic center lines of the inductive write element 2 and the MR read element 10, it is possible to most reduce the deviations between the information identification field and the data field to thereby minimize the off-track of the MR read element 10 at the time of recognizing the information identifier in the both recording and reproduction modes. This will be obvious comparing FIG. 17 with FIGS. 13 and 15 mentioned above.

Figure 17:
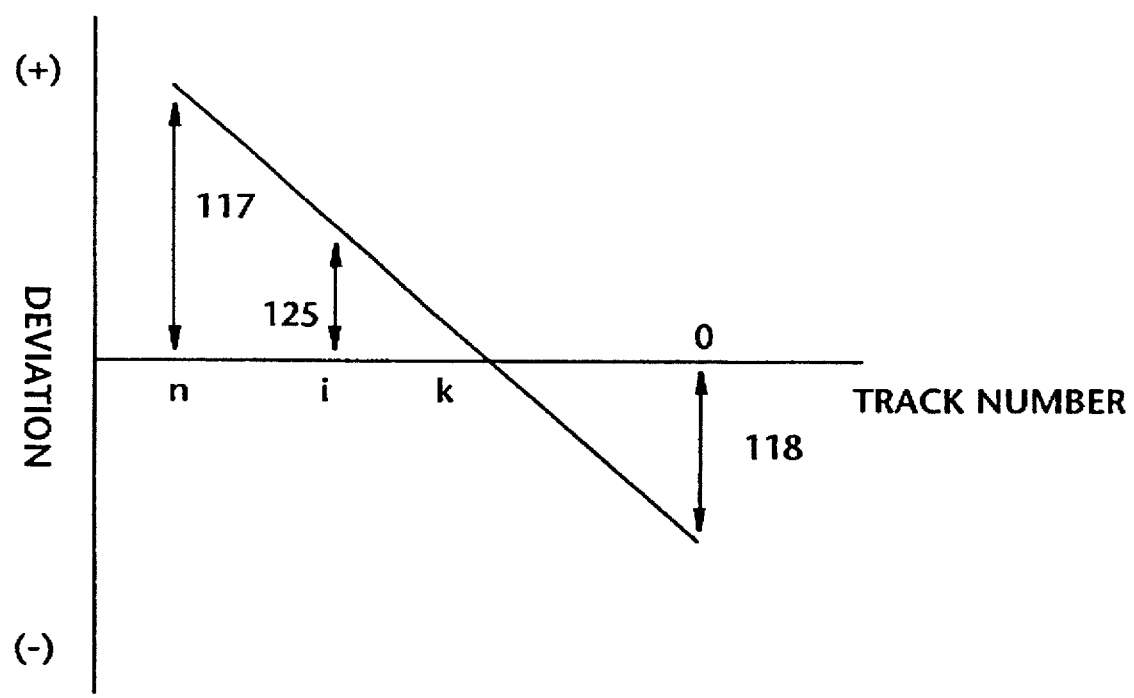
FIG. 17 is a graphic illustration for describing deviations between an information identification field and a data field at every position of a disk in the fifth embodiment.

Referring to FIG. 17 showing the deviations determined with the linear interpolation in the fifth embodiment, the absolute values of the deviations 117 and 118 at the innermost track (n) and outermost track (0) are set to be equal to each other. In addition, in the magnetic positional relationship between the inductive write element 2 and the MR read element 10 in the track crossing directions, the absolute values OFFSET become equal to the result of a multiplication of ½ of the sum of the sine sin(P1) of the slider yaw angle P1 and the sine sin(P2) of the slider yaw angle P2 by the separation S. That is, OFFSET=½×{sin(P1)+sin(P2)}×S, and when ½×{sin(P1)+sin(P2)} is defined as P (angle offset), OFFSET=P×S.

Here, as well as the above-described first embodiment, according to a study, the angle variation from the innermost portion to the outermost portion is desirable to be between 10° to 25°, and hence the angle offset value is set to be 0.175 to 0.423.

FIG. 18 shows the fifth embodiment applied to a magnetic recording/reproduction system having a head-positioning servo surface on a disk for describing the relationship in position between servo surface servo signal fields and information identification fields.

In this system, a magnetic recording surface for servo only is provided and the positioning information is read by a servo head equipped on the magnetic recording surface. In FIG. 18, numerals 121 to 124 denote servo surface servo signal fields, respectively. Although actually existing on a special servo surface different from the data surface including the data fields and the information identification fields, they are shown together with the data surface for description only. The servo signal fields 121 to 124 are formed in the servo surface and arranged successively at an equal pitch so that a center line of each of the servo signal fields 121 to 124 at which a position error signal from the servo head shows a minimum is coincident with the center line of each of the information identification fields. This pitch is different from the pitch of the data fields in the data surface, while the servo signal pitch is arranged to be the same as the pitch of the information identification fields and servo signal fields in the data surface and hence the head positioning can easily be realized by minimizing the position error signal. Although being also effective for such a servo surface type recording/reproduction system, the above-described third to fifth embodiments can take effect with only the servo signals in the data surface regardless of the servo surface.

According to the above described third to fifth embodiments, without setting the information identification fields and the data fields of tracks on the same lines, the relationship in position between the information identification fields and the data fields is made in connection with the relationship in position between the inductive write element and the MR read element in the track crossing directions so that the information identification fields are shifted by predetermined quantities from the data fields. These deviations between the information identification fields and the data fields successively vary toward the innermost or outermost portion of the disk or toward both the innermost and outermost portions. These arrangements allow preventing the recognition of the information identification fields from lowering due to the off-track between the inductive write element and the MR read element and further allows reducing the reproduction errors and improving the throughput.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An integrated head mounted on a head slider which is arranged to be rotatable about a point so as to be accessible to tracks of a disk serving as a recording medium to make yaw angles with respect to tangents of said tracks, said integrated head comprising:

write element means having a magnetic gap for writing data on said tracks of said disk; and read element means for reading data from said tracks of said disk, said read element means having a predetermined height in a direction perpendicular to a surface of said head slider and being located so that a center of said read element means as determined in a direction substantially parallel to track crossing directions, is separated by a first predetermined distance from said gap of said write element means, and a geometric center line of said read element means, which extends in a direction substantially perpendicular to said track crossing directions, is separated by a second distance from a geometric center line of said write element means, which extends in a direction substantially perpendicular to said track crossing directions.

wherein said second distance between said write element means and said read element means is determined on the basis of the sum of the sine of said slider yaw addles with respect to the tangents of the innermost and outermost tracks, said first distance between said write element means and said read element means, and the height of said read element means.

wherein said second distance is determined according to the following equation:

$$OFFSET=\tfrac{1}{2}\times\{\sin(P1)+\sin(P2)\}\times S+\tfrac{1}{2}H$$

where

OFFSET=said second distance between said write element means and said read element means;

P1=the slider yaw angle with respect to said tangent of the innermost track;

P2=the slider yaw angle with respect to the tangent of the outermost track;

sin(P1)=the sine of the slider yaw angle P1;

sin(P2)=the sine of the slider yaw angle P2;

S=said first distance between said write element means and said read element means; and H=the height of said read element means.

2. An integrated head as claimed in claim 1, wherein the value of ½×{sin (P1)+sin (P2)} is set to be substantially equal to a value in a range from 0.175 to 0.423.

3. An integrated head mounted on a head slider which is arranged to be rotatable about a point so as to be accessible to tracks of a disk serving as a recording medium to make yaw angles with respect to tangents of said tracks, said integrated head comprising:

write element means having a magnetic gap for writing data on said tracks of said disk; and read element means for reading data from said tracks of said disk, said read element means having a predetermined height in a direction perpendicular to a surface of said head slider and being located so that a center of said read element means as determined in a direction substantially parallel to track crossing directions, is separated by a first predetermined distance from said gap of said write element means, and a geometric center line of said read element means, which extends in a direction substantially perpendicular to said track crossing directions, is separated by second distance from a geometric center line of said write element means, which extends in a direction substantially perpendicular said track crossing directions, wherein said second distance between said write element means and said read element means is determined on the basis of the sum of the sine of said slider yaw angles with respect to the tangents of the innermost and outermost tracks, said first distance between said write element means and said read element means, and the height of said read element means, wherein said second distance is determined according to the following equation:

$$OFFSET = \tfrac{1}{2} \times \{\sin (P1) + \sin (P2)\} \times S \tfrac{1}{4} \times H$$

where

OFFSET=said second distance between said write element means and said read element means;

P1=the slider yaw angle with respect to said tangent of the innermost track;

P2=the slider yaw angle with respect to the tangent of the outermost track;

sin(P1)=the sine of the slider yaw angle P1;

sin(P2)=the sine of the slider yaw angle P2;

S=said first distance between said write element means and said read element means; and H=the height of said read element means.

4. An integrated head as claimed in claim 3, wherein the value of ½×{sin (P1)+sin (P2)} is set to be substantially equal to a value in a range from 0.175 to 0.423.

5. An integrated head mounted on a head slider which is arranged to be rotatable about a point so as to be accessible to tracks of a disk serving as a recording medium to make yaw angles with respect to tangents of said tracks, said integrated head comprising:

write element means having a magnetic gap for writing data on said tracks of said disk; and read element means for reading data from said tracks of said disk, said read element means having a predetermined height in directions perpendicular to a surface of said head slider and being located so that a center of said read element means as determined in a direction parallel to a track crossing direction is separated by a predetermined distance from said gap of said write element means, wherein the slider yaw angle (P1) with respect to said tangent of the innermost track, the slider yaw angle (P2) with respect to said tangent of the outermost track, said predetermined distance S between said write element means and said read element means and the height H of said read element means are arranged to satisfy the following equation:

$$\tfrac{1}{2} \times \{\sin (P1) + \sin (P2)\} \times S = \tfrac{1}{4} H$$

where sin(P1)= the sine of the slider yaw angle P1; and sin(P2)= the sine of the slider yaw angle P2.

6. An integrated head as claimed in claim 5, wherein the value of ½×{sin (P1)+sin (P2)} is set to be substantially equal to a value in a range from 0.175 to 0.423.

* * * * *